United States Patent [19]

Derencsenyi

[11] Patent Number: 4,611,018
[45] Date of Patent: * Sep. 9, 1986

[54] METHOD OF PROCESSING A FLUOROELASTOMER COMPOSITION

[75] Inventor: Tibor T. Derencsenyi, Mountain View, Calif.

[73] Assignee: Raychem Corporation, Menlo Park, Calif.

[*] Notice: The portion of the term of this patent subsequent to Feb. 4, 2003 has been disclaimed.

[21] Appl. No.: 682,395

[22] Filed: Dec. 17, 1984

[51] Int. Cl.$^4$ ............................................. C08K 5/53
[52] U.S. Cl. ............................... 524/130; 264/176 R; 264/331.13; 264/176.1; 264/331.14; 524/145; 524/520; 524/524; 525/388
[58] Field of Search ............... 524/130, 145, 520, 524; 525/388; 264/176 R, 331.13, 331.14

[56] References Cited

U.S. PATENT DOCUMENTS 4,568,716 2/1986 Derencsenyi .................... 524/520

OTHER PUBLICATIONS

Hawley, The Condensed Chemical Dictionary, Ninth Edition, 1977, p. 112.

Primary Examiner—John Kight
Assistant Examiner—Kriellion Morgan
Attorney, Agent, or Firm—Ira David Blecker

[57] ABSTRACT

There is disclosed a method of processing a fluoroelastomer composition. In a preferred embodiment, the method comprises formulating a fluoroelastomer composition consisting essentially of about 50-99 weight percent of AFLAS ®, about 0-50 weight percent of a polymer filler, about 1-25 weight percent of dimethyl methyl phosphonate, and about 0-15 weight percent of trioctyl phosphate. The method further comprises loading the composition into either a blow molding or extruding apparatus, and then blow molding or extruding, respectively, the composition into a predetermined shape.

20 Claims, No Drawings

METHOD OF PROCESSING A FLUOROELASTOMER COMPOSITION

RELATED APPLICATION

This application is related to U.S. Ser. No. 682,394 now U.S. Pat. No. 4,568,716, filed even date herewith entitled "Fluoroelastomer Composition and Article," which is incorporated herein by reference.

BACKGROUND OF THE INVENTION

This invention relates to the field of processing of fluoroelastomer compositions.

In a never-ending search for improved materials, attention has been focused on fluoroelastomers because of their inherent chemical inertness. Of course, fluoroelastomers in general are well known. In this regard, see "The Vanderbilt Rubber Handbook," Robert O. Babbit, R. T. Vanderbilt Co., Inc., pp. 244-253 (1978). Unfortunately, this desirable inherent chemical inertness causes problems of its own. One problem is that blending anything into them is unusually difficult. In certain fluoroelastomers, for example, it is difficult to blend more than 1 or 2% of a processing oil, wax, or lubricant into the material without it bleeding to the surface in a relatively short time.

Another problem relates to their processing, in particular blow molding and extrusion. Blow molding and extrusion are, of course, manufacturing processes well known to those skilled in the art. Certain fluoroelastomers cannot be blow molded because they do not knit well at weld lines and can only be extruded with difficulty due to their high molecular weight. In general, rubbers are not blow molded whereas plastics are. Some thermoplastic elastomers can be blow molded but these are considered to be hybrids between rubbers and plastics.

A further problem with certain fluoroelastomers is their poor flexibility (i.e., loss of elasticity) at low temperatures. This poor low temperature flexibility excludes these fluoroelastomers from use by the military and oil exploration groups where exposure to extreme cold environments is expected.

Two specific fluoroelastomers of interest are VITON® (a product of E. I. du Pont de Nemours and Co., Wilmington, Del.), and AFLAS® (a product of Asahi Glass Co., Ltd., Tokyo, Japan), both of which are known. See, for example, the above "Vanderbilt Rubber Handbook." In general, VITON is a copolymer of vinylidene fluoride ($CH_2CF_2$) and hexafluoropropylene ($C_3F_6$) and AFLAS is a copolymer of tetrafluoroethylene ($C_2F_4$) and propylene ($C_3H_6$).

Both VITON and AFLAS suffer all of the above problems, to wit, difficulty in processing and loss of elasticity at low temperatures. For example, neither material can be successfully blow molded due to poor knitting at the weld lines. Too, VITON becomes functionally brittle at about $-40°$ C. and AFLAS at about $-5°$ C.

Attempts have been made to solve the above problems with additives and also by blending with other polymers such as fluorosilicones. Use of additives is discussed, in general, in "Modern Plastics Encyclopedia," Volume 58, Number 10A, pp. 202-224 (October 1981). At least with respect to VITON and AFLAS, these attempts have largely been unsuccessful.

Thus, it is an object of this invention to have a method of processing a fluoroelastomer composition so that the composition is flexible at low temperatures.

It is another object of this invention to have a method of processing a fluoroelastomer composition wherein the processing is by blow molding or by extruding.

These and other objects of the invention will become apparent after reference to the following description.

BRIEF SUMMARY OF THE INVENTION

We have discovered that by the addition of particular amounts of dimethyl methyl phosphonate and trioctyl phosphate, AFLAS compositions can be improved with respect to processiblity and low temperature flexibility. Unfortunately, these additives do not produce such efficacious results in VITON.

Thus, one aspect of the invention relates to a method of blow molding the improved AFLAS composition. A preferred composition consists essentially of about 50-99 weight percent of AFLAS, about 0-50 weight percent of a polymer filler, about 1-25 weight percent of dimethyl methyl phosphonate and about 0-15 weight percent of trioctyl phosphate.

Another aspect of the invention relates to a method of extruding the improved AFLAS composition.

DETAILED DESCRIPTION OF THE INVENTION

As previously discussed, AFLAS is known to have poor flexibility at temperatures below about $-5°$ C. It would be desirable to have an AFLAS composition that is flexible down to about $-55°$ C. so as to satisfy military and commercial requirements.

AFLAS is also difficult to process because of its inherent chemical inertness. Thus, AFLAS cannot be blow molded because it does not knit well at weld lines. It is also difficult to extrude due to its high molecular weight. Thus, it would be desirable to have an AFLAS composition that is processable.

In view of the above, there is disclosed according to the invention a method of blow molding a fluoroelastomer composition. The method comprises formulating the fluoroelastomer composition, loading the composition into a blow molding apparatus and then blow molding the composition into a predetermined shape.

There is also disclosed according to the invention a method of extruding a fluoroelastomer composition. The method comprises formulating the fluoroelastomer composition, loading the composition into an exruding apparatus and then extruding the composition into a predetermined shape.

One preferred fluoroelastomer composition according to the invention is an improved AFLAS composition consisting essentially of about 50-99 weight percent of AFLAS, about 0-50 weight percent of a polymer filler, about 1-25 weight percent of dimethyl methyl phosphate and about 0-15 weight percent of trioctyl phosphate.

Another preferred fluoroelastomer composition according to the invention is an improved AFLAS composition consisting essentially of about 50-99.5 weight percent of AFLAS, about 0-50 weight percent of a polymer filler, about 0-25 weight percent of dimethyl methyl phosphate and about a 0.5-15 weight percent of trioctyl phosphate.

The AFLAS is a fluoroelastomer copolymer of tetrafluoroethylene and propylene having the following structure:

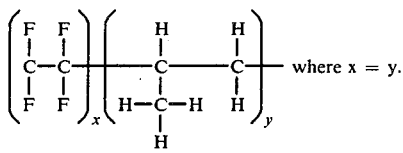 where x = y.

The dimethyl methyl phosphonate (hereafter DMMP) and the trioctyl phosphate (hereafter TOF) both act as a plasticizer and a process aid.

It has been found that the resultant formulation has improved extrusion characteristics due to its low melt viscosity. No die drool is observed and a smooth surface is produced. Further, the resultant formulation is blow moldable due to the strong knitting now present at the weld lines.

The DMMP and the TOF may be added together or separately. When DMMP is added alone or with TOF, there was improved low temperature flexibility at $-55°$ C. without a significant loss of tensile strength. This last result is surprising and unexpected since it is generally known that the addition of plasticizers, while improving flexibility, cause a drastic reduction in tensile strength.

It has been found that TOF may be added alone to improve low temperature flexibility and processing characteristics. Unfortunately, TOF also reduces tensile strength. However, if tensile strength is a relatively unimportant requirement when compared to low temperature flexibility or processing characterisitcs, then additions of TOF alone may prove to be beneficial.

When DMMP is added alone, it is believed that low temperature flexibility begins to improve when it is added in an amount of at least one weight percent. It has been found, however, that significant benefits accrue when the DMMP is added in amounts of at least 5 weight percent.

It is most preferred that DMMP be added in amounts of about 15 to 25 percent. In this range, improvements in low temperature flexibility and processing will be realized without a significant loss in tensile strength. It is, of course, advantageous to add as much DMMP as possible since DMMP is less expensive than AFLAS. However, the maximum amount of DMMP that may be added is about 25 weight percent since any amounts greater than this will cause a drastic dropoff in tensile strength.

It is believed that when at least $\frac{1}{2}$ weight percent of TOF is added to the composition, without any additions of DMMP, there will be improved low temperature flexibility and processing characteristics without a large loss in tensile strength.

If tensile strength is not an important consideration, then it is preferred that TOF alone be added in amounts of about 5 to 15 weight percent. Beyond about 15 weight percent the composition loses structural integrity.

As stated previously, DMMP and TOF may be added together or separately. When added together, tensile strength and low temperature flexibility will be within acceptable limits if the DMMP is present in an amount of about 5 to 15 weight percent and the TOF is present in an amount of about 2 to 5 weight percent.

As noted above, the composition may contain about 0 to 50 weight percent of a polymer filler. It is advantageous to add as much filler as possible (without of course detracting from the physical properties of the composition) since the filler material is less expensive than the AFLAS.

If the composition is to be heat shrinkable, then it is preferred that the polymer filler be a crystalline polymer such as polyvinlidene fluoride, polyethylene, or polypropylene.

Further advantages of the invention will become apparent after reference to the following examples.

EXAMPLES

A master batch was prepared by blending the following ingredients in a Banbury mixer. All the ingredients are commonly known and available.

TABLE 1

| Ingredient | Weight Percent |
|---|---|
| AFLAS ® 150 E fluoroelastomer | 60.66 |
| KYNAR ® 450 hold-out agent | 18.20 |
| AEROSIL ® R 972 filler | 18.20 |
| STATEX ® 160 black pigment | 0.61 |
| carnauba wax process aid | 0.61 |
| triallyl isocyanurate crosslinking agent | 0.61 |
| TE88XL process aid | 0.45 |
| sodium stearate process aid | 0.30 |
| OMYA ® BSH stabilizer | 0.30 |
| IRGANOX ® 1010 antioxidant | 0.06 |
|  | 100.00 |

From the master batch, three formulations were prepared in which various amounts of plasticizers were added. The formulations contained 13 weight percent DMMP, 6.5 weight percent TOF and 6.5 weight percent PLASTOLEIN 9250 (another commercially available plasticizer), respectively. Each of the formulations was extruded. Suitable samples were prepared and then tested for room temperature tensile strength and elongation. The results are summarized in Table 2.

TABLE 2

| Sample No. | Additive w/o | Tensile Strength psi | Elongation % |
|---|---|---|---|
| 1 | 13% DMMP | 2310 | 390 |
| 2 | 6.5% TOF | 1140 | 430 |
| 3 | 6.5% PLASTOLEIN | 1160 | 430 |

It can be seen from Table 2 that even though the DMMP is present in the greatest amount, the tensile strength is nevertheless higher than either of the other samples.

From the master batch again, 9 formulations as noted in Table 3 were prepared by adding various amounts of TOF, PLASTOLEIN 9250 and DMMP. From each of the 9 formulations, three 6-inch by 75-mil thickness slabs were prepared and then exposed to a beam of electrons for a dose of 5 megarads (Mrads) on each side or a total dose of 10 Mrads. The room temperature tensile strength and elongation were measured. Additionally, each slab was tested for low temperature flexibility by bending the slab around a $\frac{3}{8}$-inch mandrel at $-55°$ C. The results of the low temperature flexbility test are reported by number passed to number tested. One set of data was taken with samples prepared on a cold mill and a second set taken with samples prepared on a hot mill. The results are tabulated in Tables 4 and 5 respectively.

TABLE 3

| Sample No. | TOF w/o | PLASTOLEIN 9250, w/o | DMMP w/o |
|---|---|---|---|
| 4 | 4.35 | 4.35 | 4.35 |
| 5 | 4.55 | 0 | 4.55 |
| 6 | 2.73 | 0 | 6.36 |
| 7 | 0 | 0 | 13 |
| 8 | 1.74 | 0 | 11.33 |
| 9 | 0 | 1.74 | 11.33 |
| 10 | 0 | 2.73 | 6.36 |
| 11 | 4.2 | 0 | 12.5 |
| 12 | 0 | 4.2 | 12.5 |

TABLE 4
(Cold Milled)

| Sample No. | Tensile Strength psi | Elongation % | Flexibility |
|---|---|---|---|
| 4 | 900 | 420 | 3/3 |
| 5 | 1250 | 400 | 0/3 |
| 6 | 1890 | 370 | 0/3 |
| 7 | 3000 | 380 | 2/3 |
| 8 | 2260 | 370 | 1/3 |
| 9 | 1950 | 380 | 0/3 |
| 10 | 1230 | 280 | 0/3 |
| 11 | 1060 | 280 | 0/3 |
| 12 | 1220 | 340 | 0/3 |

The results in Tables 4 and 5 are similar with flexibility being somewhat improved in the hot milled samples. This improved flexibility is believed due to better homogeneity of the composition as a result of the hot milling. As can be seen, the compositions containing PLASTOLEIN 9250 did not exhibit an acceptable combination of good tensile strength and good flexibility. Further, the best results were obtained with DMMP alone or DMMP in combination with TOF.

TABLE 5
(Hot Milled)

| Sample No. | Tensile Strength psi | Elongation % | Flexibility |
|---|---|---|---|
| 4 | 1120 | 400 | 3/3 |
| 5 | 1800 | 370 | 3/3 |
| 6 | 2190 | 330 | 3/3 |
| 7 | 3180 | 350 | 3/3 |
| 8 | 2250 | 350 | 0/3 |
| 9 | 1740 | 370 | 0/3 |
| 10 | 1730 | 400 | 0/3 |
| 11 | 1730 | 370 | 2/3 |
| 12 | 1700 | 400 | 0/3 |

A second master batch was prepared in the same manner as before with the following ingredients as shown in Table 6. AFLAS 150P is a cheaper, higher molecular weight version of AFLAS 150E, used in the previous examples.

TABLE 6

| Ingredient | Weight Percent |
|---|---|
| AFLAS 150 P fluoroelastomer | 64.58 |
| KYNAR 450 hold-out agent | 19.37 |
| AEROSIL R 972 filler | 12.92 |
| STATEX 160 black pigment | 0.65 |
| carnauba wax process aid | 0.65 |
| triallyl isocyanurate crosslinking agent | 0.65 |
| TE88XL process aid | 0.48 |
| sodium stearate process aid | 0.32 |
| OMYA BSH stabilizer | 0.32 |
| IRGANOX 1010 antioxidant | 0.06 |
| | 100.00 |

In this master batch, varying amounts of DMMP were added. Slabs were prepared, beamed to a total dose of 6 Mrads and then tested for room temperature tensile strength and elongation. The results are tabulated in Table 7.

TABLE 7

| Sample No. | DMMP w/o | Tensile Strength psi | Elongation % |
|---|---|---|---|
| 13 | 0 | 2880 | 360 |
| 14 | 3.13 | 2600 | 350 |
| 15 | 6.07 | 2610 | 370 |
| 16 | 8.83 | 2410 | 380 |

It is apparent from Table 7 that increasing the amount of DMMP does not greatly decrease tensile strength.

A final set of samples were prepared to examine the effect of adding DMMP to a composition similar to that of Table 6 except that VITON AHV (a copolymer of vinylidene fluoride and hexafluoropropylene) was substituted for the AFLAS 150P. Six formulations of VITON plus increasing amounts of DMMP were blended and then formed into slabs. Each slab was irradiated to a total dose of 5 Mrads. The samples were then tested for tensile strength, elongation, and low temperature ($-55°$ C.) flexiblity. The results are tabulated in Table 8.

TABLE 8

| Sample No. | DMMP w/o | Tensile Strength psi | Elongation % | Flexibility |
|---|---|---|---|---|
| 17 | 0 | 2390 | 450 | 0/3 |
| 18 | 4.76 | 2190 | 520 | 0/3 |
| 19 | 9.09 | 1280 | 560 | 0/3 |
| 20 | 13.04 | 990 | 460 | 0/3 |
| 21 | 16.67 | 810 | 500 | 0/3 |
| 22 | 20 | * | * | * |

*material had no strength; sample fell apart

Comparing the results in Table 8 to the previous results, it is immediately apparent that the effect of DMMP in VITON stands in marked contrast to the effect of DMMP in AFLAS. Thus, when DMMP is added to VITON, tensile strength is rapidly degraded and flexibility is not improved at all.

It is important to understand and appreciate that there is a high degree of specificity required when matching polymeric materials even though AFLAS, DMMP, and TOF are known proven compositions. The fact that DMMP was combined with VITON (a closely related fluoroelastomer compound to AFLAS) to produce a composition with disasterous properties in contrast to the favorable results produced according to the invention amply illustrates the point.

It will be obvious to those skilled in the art having regard to this disclosure that other modifications of this invention beyond those embodiments specifically described here may be made without departing from the spirit of the invention. Accordingly, such modifications are considered within the scope of the invention as limited solely by the appended claims.

I claim:

1. A method of blow molding a fluoroelastomer composition comprising the steps of:
    formulating a fluoroelastomer composition consisting essentially of:
    (a) about 50-99 weight percent of a fluoroelastomer copolymer of tetrafluoroethylene and propylene having the following structure:

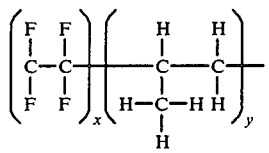

where x=y;
    (b) about 0-50 weight percent of a polymer filler;
    (c) about 1-25 weight percent of dimethyl methyl phosphonate (DMMP) and;
    (d) about 0-15 weight percent of trioctyl phosphate (TOF);
    loading the composition into a blow molding apparatus; and
    blow molding the composition into a predetermined shape.
2. The method of claim 1 wherein there is at least 5 weight percent of DMMP and the TOF is not present.
3. The method of claim 1 wherein there is at least 15 weight percent of DMMP and the TOF is not present.
4. The method of claim 1 wherein there is at least 0.5 weight percent of TOF.
5. The method of claim 4 wherein there is at least 5 weight percent of TOF.
6. The method of claim 1 wherein there is about 5-15 weight percent of DMMP and about 2-5 weight percent of TOF.
7. The method of claim 1 wherein the polymer filler is a crystalline polymer.
8. A method of blow molding a fluoroelastomer composition comprising the steps of:
    formulating a fluoroelastomer composition consisting essentially of:
    (a) about 50-99.5 weight percent of a fluoroelastomer copolymer of tetrafluoroethylene and propylene having the following structure:

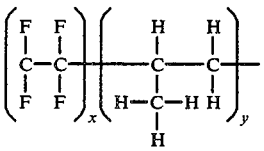

where x=y;
    (b) about 0-50 weight percent of a polymer filler;
    (c) about 0-25 weight percent of dimethyl methyl phosphonate (DMMP) and;
    (d) about 0.5-15 weight percent of trioctyl phosphate (TOF);
    loading the composition into a blow molding apparatus; and
    blow molding the composition into a predetermined shape.
9. The method of claim 8 wherein there is at least 5 weight percent of TOF and the DMMP is not present.
10. The method of claim 8 wherein the polymer filler is a crystalline polymer.

11. A method of extruding a fluoroelastomer composition comprising the steps of:
    formulating a fluoroelastomer composition consisting essentially of:
    (a) about 50-99 weight percent of a fluoroelastomer copolymer of tetrafluoroethylene and propylene having the following structure:

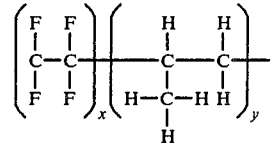

where x=y;
    (b) about 0-50 weight percent of a polymer filler;
    (c) about 1-25 weight percent of dimethyl methyl phosphonate (DMMP) and;
    (d) about 0-15 weight percent of trioctyl phosphate (TOF);
    loading the composition into an extruding apparatus; and
    extruding the composition into a predetermined shape.
12. The method of claim 11 wherein there is at least 5 weight percent of DMMP and the TOF is not present.
13. The method of claim 11 wherein there is at least 15 weight percent of DMMP and the TOF is not present.
14. The method of claim 11 wherein there is at least 0.5 weight percent of TOF.
15. The mehtod of claim 14 wherein there is at least 5 weight percent of TOF.
16. The method of claim 11 wherein there is about 5-15 weight percent of DMMP and about 2-5 weight percent of TOF.
17. The method of claim 11 wherein the polymer filler is a crystalline polymer.
18. A method of extruding a fluoroelastomer composition comprising the steps of:
    formulating a fluoroelastomer composition consisting essentially of:
    (a) about 50-99.5 weight percent of a fluoroelastomer copolymer of tetrafluoroethylene and propylene having the following structure:

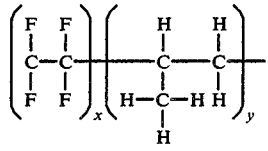

where x=y;
    (b) about 0-50 weight percent of a polymer filler;
    (c) about 0-25 weight percent of dimethyl methyl phosphonate (DMMP) and;
    (d) about 0.5-15 weight percent of trioctyl phosphate (TOF);
    loading the composition into an extruding apparatus; and
    extruding the composition into a predetermined shape.
19. The method of claim 18 wherein there is at least 5 weight percent of TOF and the DMMP is not present.
20. The method of claim 11 wherein the polymer filler is a crystalline polymer.

* * * * *